United States Patent
Jovenall (10) Patent No.: US 11,173,934 B2
(45) Date of Patent: Nov. 16, 2021

(54) AUTOMATED RAILROAD SAFETY SYSTEMS

(71) Applicant: Laird Technologies, Inc., Chesterfield, MO (US)

(72) Inventor: Jeremy Jovenall, Mercer, PA (US)

(73) Assignee: Cattron North America, Inc., Warren, OH (US)

( * ) Notice: Subject to any disclaimer, the term of this patent is extended or adjusted under 35 U.S.C. 154(b) by 267 days.

(21) Appl. No.: 16/146,527

(22) Filed: Sep. 28, 2018

(65) Prior Publication Data
US 2020/0070858 A1    Mar. 5, 2020

Related U.S. Application Data (60) Provisional application No. 62/725,666, filed on Aug. 31, 2018.

(51) Int. Cl.
| | | |
|---|---|---|
| *B61L 23/14* | (2006.01) | |
| *B61L 23/06* | (2006.01) | |
| *B61L 27/00* | (2006.01) | |

(52) U.S. Cl.
CPC ............... *B61L 23/14* (2013.01); *B61L 23/06* (2013.01); *B61L 27/0038* (2013.01)

(58) Field of Classification Search
CPC .......... B61L 23/14; B61L 23/08; B61L 23/10; B61L 23/12; B61L 23/007; B61L 23/06; B61L 23/16; B61L 27/0038
USPC .......................................................... 701/19
See application file for complete search history.

(56) References Cited

U.S. PATENT DOCUMENTS

| | | | | |
|---|---|---|---|---|
| 8,344,877 | B2 * | 1/2013 | Sheardown | B61L 23/06 340/539.13 |
| 8,509,971 | B1 * | 8/2013 | Isailovski | B60T 13/665 701/20 |
| 8,786,428 | B2 * | 7/2014 | Sheardown | B61L 23/06 340/539.13 |
| 9,260,080 | B2 | 2/2016 | Maguire et al. | |
| 9,403,545 | B2 * | 8/2016 | Pirtle | B61L 25/06 |

(Continued)

FOREIGN PATENT DOCUMENTS

WO    WO-2017004229 A1    1/2017

OTHER PUBLICATIONS

European Search Report for EP Application No. 19191900.0 which claims priority to the instant application; dated Jan. 20, 2020, 5 pages.

(Continued)

*Primary Examiner* — Isaac G Smith
(74) *Attorney, Agent, or Firm* — Harness, Dickey & Pierce, P.L.C.; Anthony G. Fussner (57) ABSTRACT

A control unit for controlling a rolling stock includes a user interface. The control unit is configured to receive, via the user interface, a plurality of user inputs corresponding to a plurality of users servicing the rolling stock, determine whether at least one user of the plurality of users remains servicing the rolling stock, and if at least one user of the one or more users remains servicing the rolling stock, prevent unauthorized movement of the rolling stock. Other example control units, computer systems including one or more control units, and computer-implemented methods for preventing unauthorized movement of a rolling stock are also disclosed.

24 Claims, 4 Drawing Sheets

(56) References Cited

U.S. PATENT DOCUMENTS

| | | | |
|---|---|---|---|
| 9,542,852 B2 * | 1/2017 | Cross | G08G 9/00 |
| 9,623,885 B1 * | 4/2017 | Shubs, Jr. | B61L 15/0018 |
| 2011/0006912 A1 * | 1/2011 | Sheardown | B61L 23/06 |
| | | | 340/901 |
| 2012/0176217 A1 * | 7/2012 | Tamaribuchi | B61L 23/06 |
| | | | 340/5.7 |
| 2015/0207130 A1 | 7/2015 | Maguire et al. | |
| 2018/0222505 A1 * | 8/2018 | Chung | B61L 27/04 |

OTHER PUBLICATIONS

Lock Out Tag Out Software/LOTO Training Tool/Field iD, http://www.fieldid.com/features/lockout-tagout, printed Sep. 27, 2017, 6 pages.
Pt. 218, App. B, 49 CFR Ch. II (Oct. 1, 2011 Edition), p. 230.

* cited by examiner

AUTOMATED RAILROAD SAFETY SYSTEMS

CROSS-REFERENCE TO RELATED APPLICATION

This application claims priority to and the benefit of U.S. Provisional Application No. 62/725,666 filed Aug. 31, 2018. The entire disclosure of the above application is incorporated herein by reference.

FIELD

The present disclosure relates to automated railroad safety systems.

BACKGROUND

This section provides background information related to the present disclosure which is not necessarily prior art.

Railroad cars, locomotives, and/or other rolling stock commonly require service to address routine and/or unexpected issues. In some jurisdictions, government regulations require precautionary measures be taken (e.g., "Blue Signal Protection" in the United States as outlined in 49 CFR § 218, etc.) when workers are servicing the rolling stock. In such examples, workers commonly place mechanical barriers on tracks around the rolling stock to prevent other railroad cars, locomotives, etc. from rolling into the work area and causing harm. These mechanical barriers may include derailing devices physically locked onto the tracks and padlocks on track switches to prevent track switching. Additionally, workers may be required to place tags on controls (e.g., throttle handles, switch controllers, etc.) of the rolling stock and/or windows of the rolling stock to notify others of pending work.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

As recognized herein, there is a need for improved safety in and around railroad systems. For example, when performing work on and/or around a rolling stock (e.g., one or more locomotives, locomotive consists, railroad cars such as freight cars and passenger cars, etc.) in a railroad system, workers were responsible for mechanical safety measures to prevent accidents. In such cases, supervisors had to trust the decisions, communications and actions of workers as to whether appropriate safety measures were taken to prevent accidents. While these safety measures (e.g., derailing devices, switch locks, etc.) may prevent the rolling stock from further moving into and/or within work areas (e.g., commonly referred to as blue flag areas), they do not prevent movement (e.g., initial movement) of the rolling stock.

As further explained herein, safety in and around railroad systems may be improved by automating safety measures via one or more control units. In such examples, the control units may track users servicing a rolling stock and prevent unauthorized movement, tractive effort requests, and/or brake releases of the rolling stock. As further explained herein, this may be accomplished by, for example, electronically identifying and tracking the users servicing a rolling stock in a particular area, the time and location of the rolling stock being serviced, the type of service that is planned and/or occurring, etc. This identifying and tracking of information may influence decisions of the control units including, for example, whether functional limitations are applied to the rolling stock.

Figure 1:
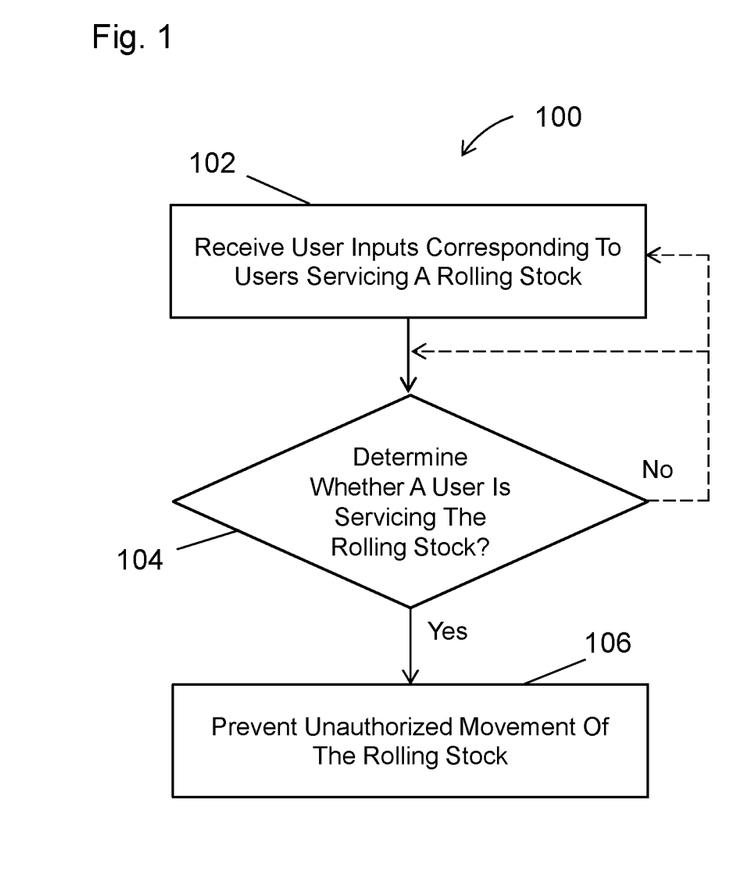
FIG. 1 is a flow chart of a method for preventing unauthorized movement of a rolling stock according to one example embodiment of the present disclosure.

For example, a computer-implemented method for preventing unauthorized movement of a rolling stock according to one example embodiment of the present disclosure is illustrated in FIG. 1 and indicated generally by reference number 100. As shown in FIG. 1, the method 100 includes receiving user inputs corresponding to users servicing the rolling stock (e.g., a locomotive, etc.) in block 102, determining whether a user remains servicing the rolling stock in block 104, and if so, preventing unauthorized movement of the rolling stock in block 106. By electronically receiving the user inputs relating to the users servicing the rolling stock and electronically determining whether at least one of the users remains, user safety in and around the rolling stock may be improved as compared to a conventional system relying on physical and/or mechanical safety measures to prevent accidents.

The user inputs may be received in various manners. For example, users may provide a security code via one or more user interfaces. The security code may be scanned, entered via a keypad, etc. For instance, the user may manually enter the security code via a keypad and/or another user interface. Alternatively, the security code may be encoded in one or more barcodes such as one-dimensional barcodes and/or two-dimensional barcodes (e.g., QR codes, etc.). In such examples, the user may scan the barcode via a scanning device and/or another user interface. In other examples, the security code may be encoded using radio-frequency identification (RFID) techniques, and the user may remotely (and wirelessly) scan the security code. These examples may be referred to as a user scanning in to service a rolling stock. In some example embodiments, the users may carry, wear, etc. work-related ID badges including the security code.

Additionally, validation of the users (or their security codes) may be required depending on, for example, the locations, job title, etc. of the user. For example, validation may be required if the user scans in outside a defined secure area (e.g., a switchyard, etc.).

As explained above, the computer-implemented method 100 determines whether one or more users remain servicing the rolling stock. For example, this determination may include comparing which users remain on the job. For instance, a user may initially provide user input via the user interface to signify that he/she is servicing a particular rolling stock, as explained above. This information may be electronically stored. Later, that same user may provide user input (again) to signify that he/she is no longer servicing the rolling stock, is servicing another rolling stock, etc. For example, the user may input the same or different security code via the same or different user interface, as explained above. This may be referred to as a user scanning out. As such, the electronically stored information may be modified (e.g., erased, revised, etc.) as necessary based on the subsequent user input, and a determination may be made as to whether any user remains servicing a particular rolling stock.

Additionally, in some example embodiments, the computer-implemented method 100 may repeat the steps of receiving user inputs and/or determining whether a user is servicing a rolling stock. This may be done continually, periodically, or randomly. For example, if the method 100 determines that no user is serving a particular rolling stock in block 104, the method 100 may optionally return to block 102 to receive additional user inputs and/or block 104 to determine again whether a user is servicing a rolling stock. This is shown with dashed lines in FIG. 1. These actions ensure data from later received user inputs is processed when the method 100 determines whether a user is servicing the rolling stock in block 104 and/or preventing unauthorized movement of the rolling stock in block 106.

Once it is determined that at least one user is servicing a rolling stock, unauthorized movement of that rolling stock is prevented. For example, unauthorized movement of the rolling stock may include sending a signal to prevent the rolling stock from moving. This signal may interpret, cutoff, etc. previous instructions and/or signals instructing the rolling stock to move. For instance, when it is desirable to move a locomotive, a movement signal may be passed between a control unit and a mechanical and/or electrical device (e.g., actuator, etc.) to allow movement of the locomotive. In such example embodiments, a switching device such as a relay may be inserted between the control unit and the mechanical/electrical device. As such, the signal preventing the rolling stock from moving may be used to actuate the switching device to open the signal path between the control unit and the mechanical device thereby preventing the movement signal from reaching the mechanical device. In other examples, the movement signal may be restricted from passing in another suitable manner.

Additionally and/or alternatively, unauthorized movement of the rolling stock may include instructions preventing movement. For example, rules may be established and implemented with programmable and/or mechanical components. The rules may include, for example, logic rules related to applying and/or releasing brakes in the rolling stock. For instance, logic rules may dictate that instructions and/or the act of applying brakes override instructions and/or the act of releasing brakes. As such, a control unit and/or another programmable component may prevent the brakes from being released. In other examples, one or more pneumatic components may prevent the brakes from being released. These rule-based instructions may provide a fail-safe manner of preventing unauthorized movement of the rolling stock.

Figure 2:
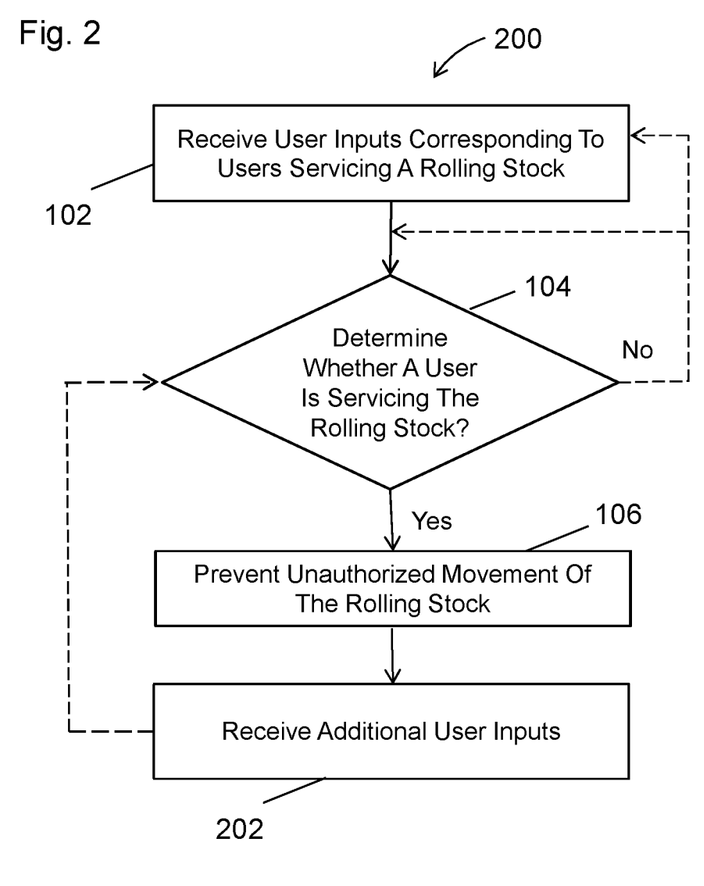
FIG. 2 is a flow chart of a method for preventing unauthorized movement of a rolling stock based on receiving multiple sets of user input according to another example embodiment.

In some example embodiments, it is desirable to receive multiple sets of user input. For example, FIG. 2 illustrates a computer-implemented method 200 substantially similar to the method 100 of FIG. 1, but capable of receiving multiple sets of user input at different times. As shown in FIG. 2, the method 200 includes the same steps explained above in blocks 102, 104, 106 relative to the method 100 of FIG. 1. Additionally, the method 200 includes receiving additional user inputs in block 202. The additional user inputs (in block 202) and the initial user inputs (in block 102) may be received via the same or different user interfaces. After the additional user inputs are received, the method 200 may return to determining whether a user is servicing the rolling stock in block 104.

The additional user inputs may be collected for various reasons. For example, the additional user inputs received in block 202 may be used to signify a particular user is no longer servicing the rolling stock, as explained above. For instance, the additional user inputs may indicate that one or more users have completed their work, are taking a break, etc. As such, in this example embodiment, the additional user inputs may assist in determining whether a user is servicing the rolling stock in block 104.

Additionally and/or alternatively, the additional user inputs may be employed for testing purposes. In some examples, testing of one or more components on and/or around the rolling stock may be required. In such examples, limited operation (e.g., movement, etc.) of the rolling stock may be required for the tests. As such, additional user inputs (in block 202) may be received for each of the determined users servicing the rolling stock (in block 104). For example, each user may input his/her security code again in block 202 to verify testing of the components on and/or around the rolling stock. This ensures that every user currently servicing the rolling stock is notified that the rolling stock may be moved, and has returned to a place of safety such as in the rolling stock (e.g., a cab of a locomotive).

In other example embodiments, receiving user inputs as explained above with reference to block 102 of FIGS. 1 and 2, and/or block 202 of FIG. 2 may include receiving user inputs from multiple groups of users and notifying one group of users of another group of users. For example, FIG. 3 illustrates another computer-implemented method 300 including receiving user inputs corresponding to a first group of one or more users (e.g., a first crew including one or more workers, etc.) servicing a component of a rolling stock in block 102, and receiving user inputs corresponding to a second group of one or more users (e.g., a second crew including one or more workers, etc.) servicing another component of the rolling stock in block 304.

For example, the first and second crew may be assigned to complete different jobs on the same rolling stock. The jobs may require the first and second crew to work near or remote from (e.g., on opposing sides of the rolling stock, etc.) each other.

Figure 3:
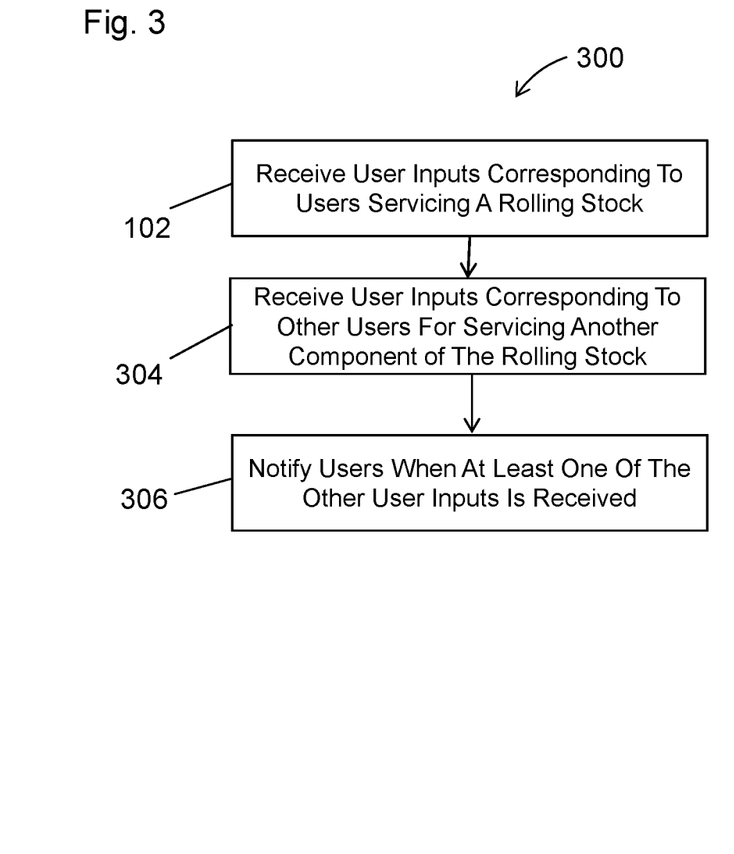
FIG. 3 is a flow chart of a method for notifying workers servicing a rolling stock of other potential workers in the area according to yet another example embodiment.

As shown in FIG. 3, the method 300 further includes notifying the first crew of the second crew in block 306. For example, the first crew may be working on one particular issue with the rolling stock. If user input is received from other users (the second crew), the first crew is notified that another crew may be in the vicinity working on another issue with the same rolling stock. In such examples, the crews may meet for a briefing to discuss jobs, work locations, safety measures, etc.

Figure 4:
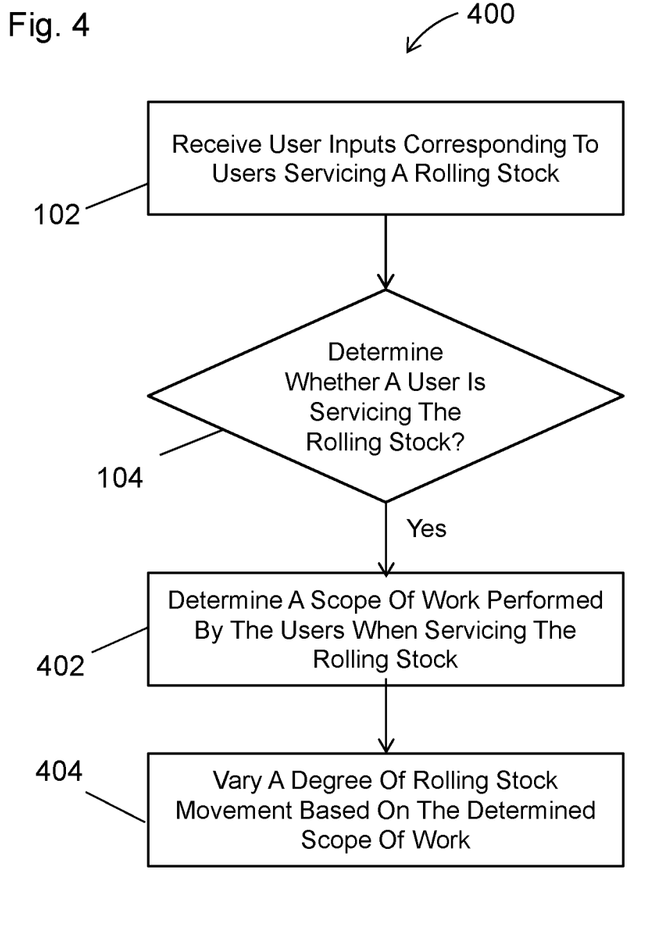
FIG. 4 is a flow chart of a method for determining a scope of work performed by workers servicing a rolling stock and varying a degree of authorized movement of the rolling stock based on the determined scope of work according to another example embodiment.

In some example embodiments, authorization may be provided to move the rolling stock. For example, FIG. 4 illustrates a computer-implemented method 400 where the rolling stock may be moved based on the scope of work performed by the users. Specifically, and as shown in FIG. 4, the method 400 includes the steps of receiving user inputs corresponding to the users servicing the rolling stock and determining whether a user remains servicing the rolling stock, as explained above with reference to blocks 102, 104 of FIGS. 1, 2 and/or 3. Once it is determined that at least one user remains servicing the rolling stock in block 104, the method 400 further includes determining a scope of work performed by the users when servicing the rolling stock in block 402, and varying a degree of rolling stock movement based on the determined scope of work in block 404.

For example, movement of the rolling stock may be required before completing work on that rolling stock. In such examples, the scope of the work may dictate the amount of movement allowed. For instance, if users are working under the rolling stock and/or on an engine of the rolling stock, little to no movement may be allowed. In this case, movement may be limited to particular components in and/or around the rolling stock that will not affect the safety of the users servicing the rolling stock. In other examples, limited movement of the rolling stock may be allowed if users are working on the interior of the rolling stock (e.g., replacing light bulbs, controls, etc.), and/or a safe distance away from the rolling stock. For example, movement may be required after work is complete to test the system, as part of troubleshooting, etc.

Figure 5:
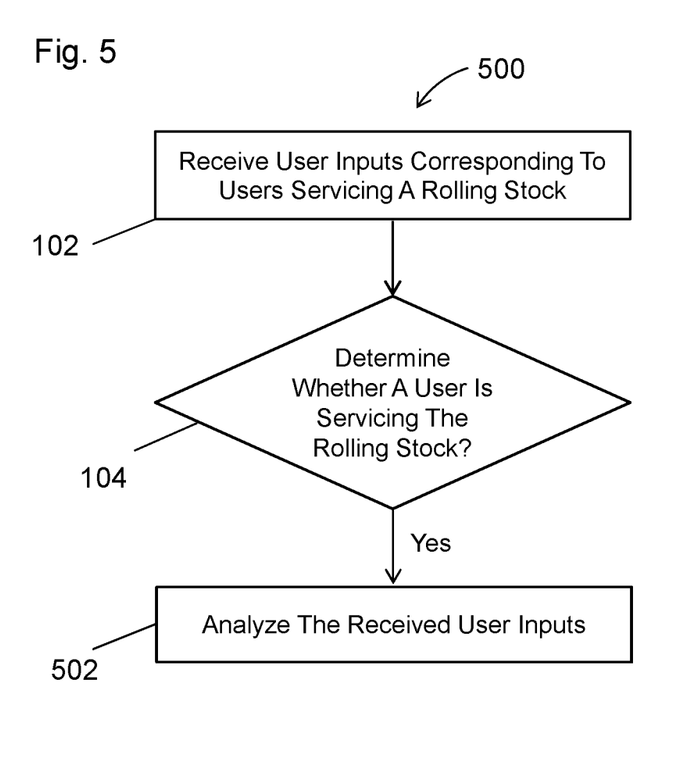
FIG. 5 is a flow chart of a method for analyzing data from user inputs to identify users servicing a rolling stock according to yet another example embodiment.

FIG. 5 illustrates another computer-implemented method 500 where received user inputs are analyzed to identify the users servicing the rolling stock. Specifically, the method 500 includes the steps of receiving user inputs and determining whether a user remains servicing the rolling stock, as explained above with reference to blocks 102, 104 of FIGS. 1, 2, 3 and/or 4. Once it is determined that at least one user remains servicing the rolling stock in block 104, the method 500 further includes analyzing the user inputs to identify the users servicing the rolling stock in block 502.

For example, analyzing the user inputs to identify the users may include determining the name, title, responsibilities, etc. of the particular users servicing the rolling stock. In some examples, this data may be used to determine an expected location of the users servicing the rolling stock, an expected duration of the work performed by the users, etc. For instance, if it is determined that a mechanic (e.g., a user, etc.) is servicing a locomotive based on the analyzed user inputs, supervisors can expect that the mechanic is working on and/or around the engine of the locomotive. Alternatively, if it is determined that an electrician (e.g., a user, etc.) is servicing the locomotive, supervisors can expect that the electrician is working on and/or around electronic components of the locomotive.

Any one or more of the methods disclosed herein may be implemented by one or more control units. For example, the control units may include memory for storing computer-readable instructions for performing the methods described above and one or more processors for executing the computer-readable instructions. Additionally and/or alternatively, the computer-readable instructions for performing the methods may be stored on a non-transitory computer-readable medium including, for example, disks, SD cards, DVD, CD-ROMs, ROMs, RAMs, EPROMs, EEPROMs, DRAMs, VRAMs, flash memory devices, or any other suitable medium for storing instructions. In some examples, the memory and/or the non-transitory computer-readable medium may include one or more databases to store data collected from the sensors as explained herein.

Figure 6:
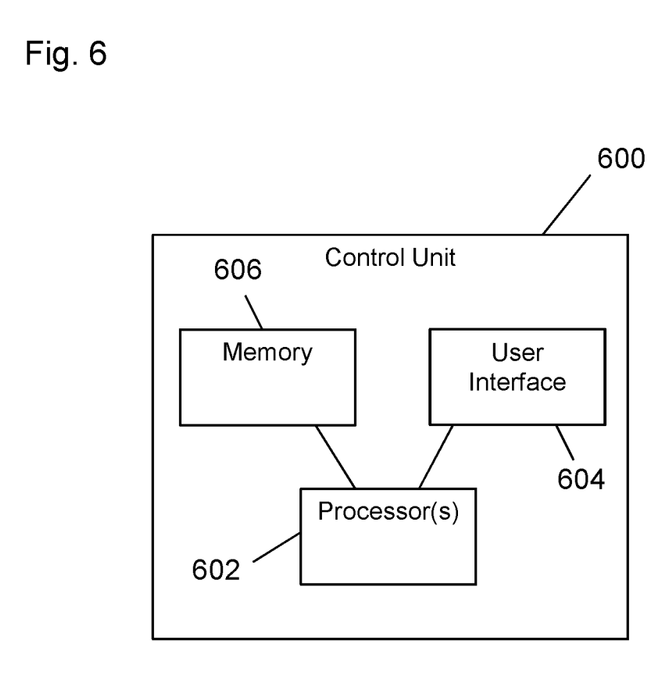
FIG. 6 is a diagram of a control unit including memory, a user interface, and one or more processors according to another example embodiment.

For example, FIG. 6 illustrates a control unit 600 for controlling a rolling stock. As shown in FIG. 6, the control unit 600 includes a user interface 604 positionable onboard the rolling stock, memory 606 for storing computer-readable instructions, and one or more processors 602 for executing the computer-readable instructions. The computer-readable instructions stored in the memory 606 and executed by the processors 602 may include, for example, instructions for performing any one or more of the methods explained above. The user interface 604 (e.g., a touch screen interface, etc.) may receive various user inputs corresponding to users servicing the rolling stock, as explained above. The user interface 604 may be, for a descriptive example, about 9 inches by about 6 inches, or any other suitable size. In another example, the user interface 604 (and/or the control unit 600) may be designed into a device, a subsystem, etc. that has functions other than those disclosed herein.

Additionally, the control unit 600 may receive input from an external device or user. For example, the control unit 600 may receive signals from a primary control unit (e.g., a supervisory unit, etc.). These signals may include alarm signals indicating a fault in and/or around the rolling stock, and/or another area outside a defined maintenance area around the rolling stock. In response, the control unit 600 may send one or more signals to the primary control unit and/or yard infrastructure equipment (e.g., track switches, brakes, etc.) in and/or around the rolling stock, create temporary speed limits in a rail yard housing the rolling stock, alert users serving the rolling stock about a possible moving rolling stock passing on adjacent tracks, set operational limits on an autonomous and/or semi-autonomous rolling stock (e.g., mobile equipment in the rail yard, etc.), etc.

Further, the control unit 600 may receive input (e.g., signals, etc.) representing one or more job orders. In response, the control unit 600 may output the job orders to electronic devices (e.g., wireless devices such as smart phones, etc.) of particular users servicing the rolling stock. In such examples, the job orders may include a list of tasks for the users servicing the railroad. The job orders (including the list of tasks) may be continually, periodically or randomly updated. This allows supervisors to schedule jobs, deliver tasks, etc. to particular users scanned in to work on the rolling stock. In some examples, the list of tasks must be completed before the user is allowed to scan out as explained above. In some circumstances, the control unit 600 may determine system-imposed limitations on rolling stock operations when one or more assigned users (e.g., workers) input information into the user interface 604 in response to a received job order.

Figure 7:
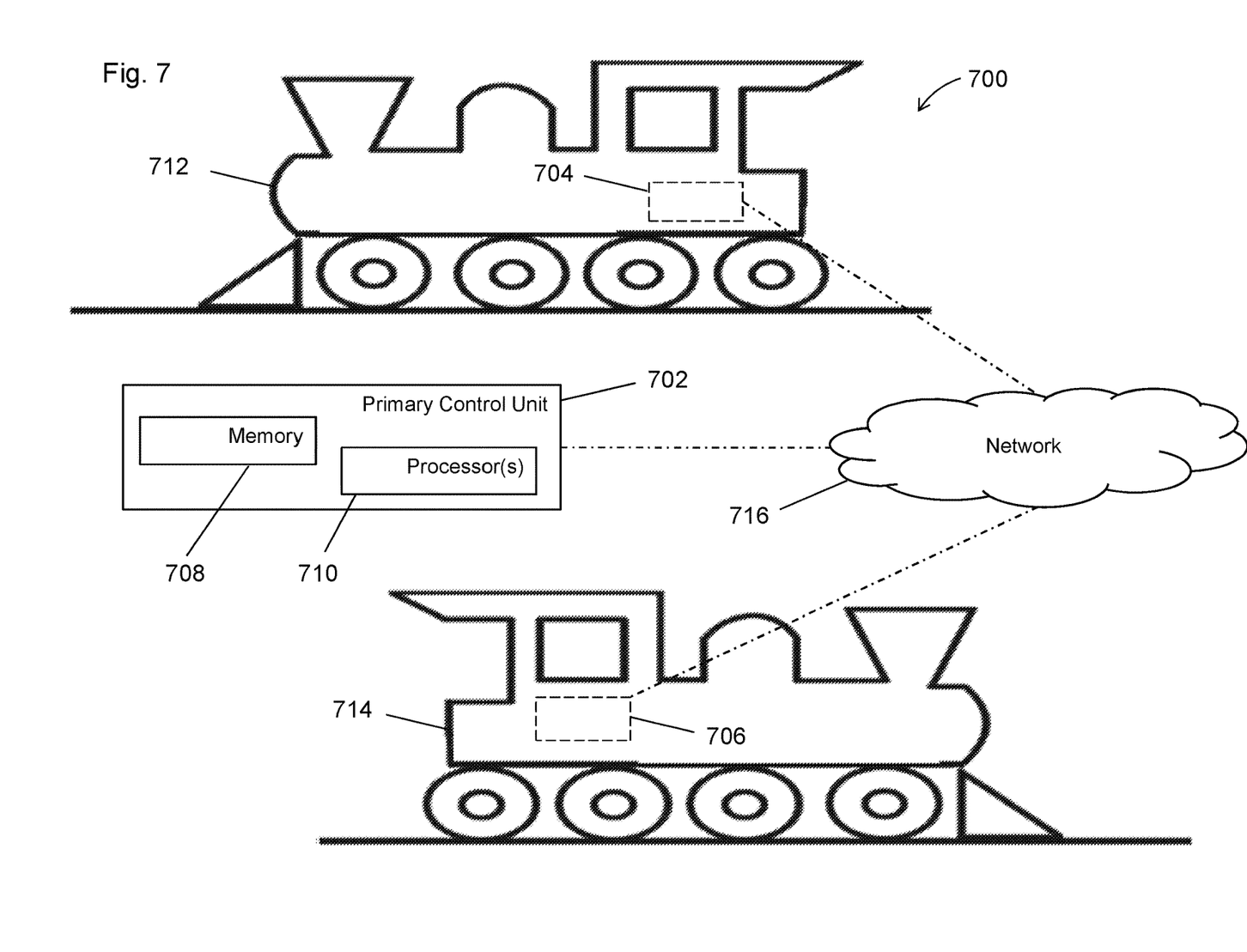
FIG. 7 is a diagram of a system including a primary control unit and two locomotives having control units in communication with the primary control unit via a wireless network according to yet another example embodiment.

FIG. 7 illustrates a computer system 700 including a primary control unit 702 and two secondary control units 704, 706 in communication with the primary control unit 702 via a communication network 716. The primary control unit 702 may be similar to any one of the control units referenced above. Specifically, and as shown in FIG. 7, the primary control unit 702 includes memory 708 for storing computer-readable instructions and one or more processor 710 for executing the computer-readable instructions, as explained above. Although not shown, the primary control unit 702 may optionally include one or more user interfaces for receiving user inputs. The control units 704, 706 each may be similar to the control unit 600 of FIG. 6. For example, the secondary control unit 704 includes appropriate components (e.g., memory, processor, transmitter, user interface, etc.) for controlling a rolling stock 712 (shown as a locomotive), and the secondary control unit 706 includes appropriate components (e.g., memory, processor, transmitter, user interface, etc.) for controlling another rolling stock 714 (shown as a locomotive). The secondary control units 704, 706 each may receive user inputs corresponding to users servicing its corresponding rolling stock, determine whether at least one user remains servicing its corresponding rolling stock, and if so, prevent unauthorized movement of the rolling stock, as explained above.

As shown in FIG. 7, the control units 704, 706 are positioned inside the locomotives 712, 714, respectively. Specifically, each control unit 704, 706 is positioned within a cab of its corresponding locomotive 712, 714. Alternatively, the control units 704, 706 may be positioned in another suitable location such as another location within the locomotives 712, 714, on the outside of the locomotive 712, 714, or adjacent to the locomotives 712, 714. In some embodiments, each control unit 704, 706 and its corresponding user interface may be placed in single location (e.g., together in the cab, etc.), or in different locations.

In the embodiment of FIG. 7, the communication network 716 is a wireless network over which the primary control unit 702 wirelessly communicates with the control units 704, 706. The wireless network 716 may be a Wi-Fi network, a cellular based network, Bluetooth, and/or any other suitable wireless network depending on, for example, the distance between the primary control unit 702 and the secondary control units 704, 706. In some examples, wireless repeaters and/or extenders may be employed if necessary. This wireless capability allows for greater flexibility in placement of the primary control unit 702. For example, the primary control unit 702 may be located in a switchyard and/or at another suitable location outside the switchyard. Additionally and/or alternatively, the primary control unit 702 may communicate with the network 716 (and/or another network) with a wired connection.

As explained above, the primary control unit 702 communicates with the secondary control units 704, 706. For example, the primary control unit 702 may send alerts such as job orders (including tasks) to appropriate users, as explained above. For example, the primary control unit 702 may push the alerts directly to remote devices carried by the users. Additionally and/or alternatively, the control unit 702 may push the alerts to the users via the control units 704, 706. The control units 704, 706 may then pass along the job orders to appropriate users if desired.

Additionally, the primary control unit 702 may restrict movement of one or both locomotives 712, 714 and/or other rolling stocks. For example, if the primary control unit 702 determines that a user is servicing the locomotive 712 via its communication with the control unit 704, the control unit 702 may restrict movement of the locomotive 714 (via its control unit 706) if it is near the locomotive 712. In some examples, a zone may be defined around the locomotive 712, and the movement of any rolling stock (e.g., the locomotive 714, etc.) within that defined zone may be restricted. The restrictions may include restricting the speed of moving rolling stocks, the location of moving rolling stocks, etc.

Further, the primary control unit 702 may receive job related data from the secondary control units 704, 706. For example, the primary control unit 702 may receive data related to the duration a particular rolling stock has been down for repairs, the particular users currently servicing a rolling stock, the duration each user has been servicing a rolling stock, etc. This information may be provided to supervisors for quality control purposes, training purposes, logging work-related experiences, and/or determining which worker(s) are assigned to work orders. As such, productivity data relating to rolling stock repairs, the efficiency of users, etc. may be monitored as desired.

As used herein, a rolling stock may refer to any movable vehicle on a railway. For example, a rolling stock may include one or more locomotives, locomotive consists, railcars (e.g., freight cars, passenger cars, etc.), and/or any other vehicles having wheels.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

It should be appreciated that one or more aspects of the present disclosure transform a general-purpose computing device into a special-purpose computing device when configured to perform the functions, methods, and/or processes described herein. None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for preventing unauthorized movement of a rolling stock including a user interface, the method comprising:
   electronically receiving, via the user interface, a plurality of user inputs;
   electronically identifying and tracking a plurality of users servicing the rolling stock by analyzing the plurality of user inputs;
   electronically determining whether at least one user of the plurality of users remains servicing the rolling stock; and
   if it is determined that at least one user of the plurality of users remains servicing the rolling stock, preventing unauthorized movement of the rolling stock including preventing initial movement of the rolling stock from a stationary position along a track within a work area defined around the rolling stock by:
      preventing brakes of the rolling stock from being released via one or more pneumatic components, thereby preventing the rolling stock from initiating a movement from the stationary position along the track within the work area defined around the rolling stock; and/or
      preventing the rolling stock from receiving or accepting a movement command, thereby preventing the rolling stock from initiating a movement from the stationary position along the track within the work area defined around the rolling stock.

2. The computer-implemented method of claim 1 wherein the plurality of user inputs are a first plurality of user inputs, the method further comprising electronically receiving, via the user interface, one or more second user inputs indicating that one or more users of the plurality of users are no longer servicing the rolling stock, and comparing the plurality of users associated with the first plurality of user inputs with the one or more users associated with the one or more second user inputs that are no longer servicing the rolling stock to thereby determine whether at least one user of the plurality of users remains servicing the rolling stock.

3. The computer-implemented method of claim 1 wherein the plurality of user inputs are a first plurality of user inputs, the method further comprising electronically receiving, via the user interface, a second plurality of user inputs corresponding to the plurality of users servicing the rolling stock and allowing limited movement of the rolling stock if a second user input is electronically received for each of the plurality of users servicing the rolling stock.

4. The computer-implemented method of claim 1 wherein electronically receiving the plurality of user inputs includes electronically receiving a first plurality of user inputs indicating that a first plurality of users are servicing a first component of the rolling stock and electronically receiving a second plurality of user inputs indicating that a second plurality of users are servicing a second component of the rolling stock.

5. The computer-implemented method of claim 1 wherein:
   electronically identifying and tracking the plurality of users servicing the rolling stock includes electronically analyzing the plurality of user inputs to determine names, titles, and responsibilities of the plurality of users serving the rolling stock; and/or
   the method includes a user electronically providing a user input to signify that the user is servicing the rolling stock along the track within the work area, and the user electronically providing another user input to signify that the user is no longer servicing the rolling stock or is servicing another rolling stock.

6. The computer-implemented method of claim 1 wherein the rolling stock is a locomotive, and wherein preventing the rolling stock from receiving or accepting a movement command comprises sending a signal that cutoffs or overrides instructions and/or signals authorizing or instructing movement of the locomotive.

7. The computer-implemented method of claim 1 wherein the method includes preventing the rolling stock from receiving a movement command by actuating a switching device to open a signal path preventing the movement command from passing along the signal path and thereby preventing the rolling stock from initiating a movement from the stationary position along the track within the work area defined around the rolling stock.

8. The computer-implemented method of claim 1 wherein:
   electronically identifying and tracking the plurality of users servicing the rolling stock includes electronically analyzing the plurality of user inputs to determine an expected location of the users servicing the rolling stock and an expected duration of the work performed by the users; and
   the electronic receipt of the plurality of user inputs indicates that the plurality of users are servicing the rolling stock including repairing or performing work on the rolling stock that is along the track within the work area defined around the rolling stock.

9. The computer-implemented method of claim 1 wherein electronically identifying and tracking the plurality of users servicing the rolling stock includes electronically identifying and tracking the plurality of users that are servicing the rolling stock in a particular area, a time and a location of the rolling stock being serviced, and a type of service.

10. A control unit for controlling a rolling stock, the control unit including a user interface positionable onboard the rolling stock, the control unit is configured to electronically receive, via the user interface, a plurality of user inputs, electronically identify and track a plurality of users servicing the rolling stock by analyzing the plurality of user inputs, electronically determine whether at least one user of the plurality of users remains servicing the rolling stock, and if it is determined that at least one user of the plurality of users remains servicing the rolling stock, prevent, via the control unit onboard the rolling stock, unauthorized movement of the rolling stock including initial movement of the rolling stock from a stationary position along a track within a work area defined around the rolling stock by:
preventing brakes of the rolling stock from being released via one or more pneumatic components, thereby preventing the rolling stock from initiating a movement from the stationary position along the track within the work area defined around the rolling stock; and/or
preventing the rolling stock from receiving or accepting a movement command, thereby preventing the rolling stock from initiating a movement from the stationary position along the track within the work area defined around the rolling stock.

11. The control unit of claim 10 wherein the plurality of user inputs are a first plurality of user inputs, wherein the control unit is configured to electronically receive, via the user interface, one or more second user inputs indicating that one or more users of the plurality of users are no longer servicing the rolling stock, and to compare the plurality of users associated with the first plurality of user inputs with the one or more users associated with the one or more second user inputs that are no longer servicing the rolling stock to thereby determine whether at least one user of the plurality of users remains servicing the rolling stock.

12. The control unit of claim 10 wherein the plurality of user inputs are a first plurality of user inputs, and wherein the control unit is configured to electronically receive, via the user interface, a second plurality of user inputs corresponding to the plurality of users servicing the rolling stock and allow limited movement of the rolling stock if a second user input is electronically received for each of the plurality of users servicing the rolling stock.

13. The control unit of claim 10 wherein the plurality of user inputs includes a first plurality of user inputs indicating that a first plurality of users are servicing a first component of the rolling stock and a second plurality of user inputs indicating that a second plurality of users are servicing a second component of the rolling stock.

14. The control unit of claim 10 wherein the control unit is configured to electronically analyze the plurality of user inputs to determine an expected location of the users servicing the rolling stock and an expected duration of the work performed by the users.

15. The control unit of claim 10 wherein the control unit is configured to send a signal that cutoffs or overrides instructions and/or signals authorizing or instructing movement of the rolling stock and prevent the rolling stock from receiving or accepting a movement command.

16. The control unit of claim 10 wherein the control unit is configured to prevent the rolling stock from receiving a movement command by sending a signal to actuate a switching device to open a signal path preventing the movement command from passing along the signal path and thereby prevent the rolling stock from initiating movement from the stationary position along the track within the work area defined around the rolling stock.

17. The control unit of claim 10 wherein the control unit is configured to analyze the plurality of user inputs to electronically identify and track the plurality of users that are servicing the rolling stock in a particular area, a time and a location of the rolling stock being serviced, and a type of service.

18. The control unit of claim 10 wherein the control unit is configured to receive an alarm signal from another control unit.

19. The control unit of claim 10 wherein the control unit is configured to electronically analyze the plurality of user inputs to determine names, titles, and responsibilities of the plurality of users serving the rolling stock.

20. The control unit of claim 10 wherein the control unit is configured to prevent unauthorized movement of the rolling stock until the control unit has electronically received, via the user interface, one or more additional user inputs, the receipt of which indicates that the plurality of users have scanned out and that no user is servicing the rolling stock.

21. A computer system comprising a primary control unit and a plurality of secondary control units in communication with the primary control unit, the plurality of secondary control units configured to control a plurality of rolling stocks, each of the plurality of secondary control units including a user interface positionable onboard one of the plurality of rolling stocks, at least one of the plurality of secondary control units corresponding to at least one rolling stock of the plurality of rolling stocks and configured to electronically receive, via its user interface, a plurality of user inputs, electronically identify and track a plurality of users servicing the at least one rolling stock by analyzing the plurality of user inputs, electronically determine whether at least one user of the plurality of users remains servicing the at least one rolling stock, and if it is determined that at least one user of the plurality of users remains servicing the at least one rolling stock, prevent, via the secondary control unit onboard the at least one rolling stock, unauthorized movement of the at least one rolling stock including initial movement of the at least one rolling stock from a stationary position along a track within a work area defined around the at least one rolling stock by:
preventing brakes of the at least one rolling stock from being released via one or more pneumatic components, thereby preventing the at least one rolling stock from initiating a movement from the stationary position along the track within the work area defined around the at least one rolling stock; and/or
preventing the at least one rolling stock from receiving or accepting a movement command, thereby preventing the at least one rolling stock from initiating a movement from the stationary position along the track within the work area defined around the at least one rolling stock.

22. The computer system of claim 21 wherein the at least one of the plurality of secondary control units is configured to electronically analyze the plurality of user inputs to electronically identify and track the plurality of users that are servicing the at least one rolling stock in a particular area, a time and a location of the at least one rolling stock being serviced, and a type of service.

23. The computer system of claim 21 wherein the at least one of the plurality of secondary control units is configured to electronically analyze the plurality of user inputs to determine names, titles, and responsibilities of the plurality of users serving the rolling stock.

24. The computer system of claim 21 wherein the primary control unit is configured to:
determine whether at least one user of the plurality of users is servicing the at least one rolling stock within the work area via wireless communication with the secondary control unit onboard the at least one rolling stock; and
prevent movement of any of the plurality of rolling stocks that are within the work area, via the secondary control units onboard the plurality of rolling stocks, including initial movement from a stationary position along the track within the work area if the primary control unit determines that at least one user of the plurality of users is servicing the at least one rolling stock within the work area.

* * * * *